US008732665B2

(12) United States Patent
Vedula et al.

(10) Patent No.: US 8,732,665 B2
(45) Date of Patent: May 20, 2014

(54) DEPLOYING ENVIRONMENTS FOR TESTING BY PROVIDING INSTANTANEOUS AVAILABILITY OF PREBUILT ENVIRONMENTS

(75) Inventors: Ravi S. Vedula, Redmond, WA (US); Michael Frank Caver, Bellevue, WA (US); Jason Scott Cipra, Woodinville, WA (US); Felix Antonio Deschamps, Remond, WA (US); Andrew Ryan Dotson, Bothell, WA (US); Michael Dean McClellan, Redmond, WA (US); Jason Lawrence Muramoto, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/171,387

(22) Filed: Jun. 28, 2011

(65) Prior Publication Data

US 2013/0007710 A1 Jan. 3, 2013

(51) Int. Cl.
| *G01R 27/28* | (2006.01) |
| *G06F 9/44* | (2006.01) |
| *G06F 15/16* | (2006.01) |
| *G06F 11/00* | (2006.01) |
| *G06F 15/177* | (2006.01) |
| *G06F 9/445* | (2006.01) |
| *G06F 9/455* | (2006.01) |

(52) U.S. Cl.
USPC ............. 717/124; 702/119; 703/22; 709/202; 714/32; 715/735; 715/771; 717/104; 717/120; 717/174; 717/168; 717/178; 718/1

(58) Field of Classification Search
CPC ............... G06F 8/10; G06F 8/34; G06F 8/60; G06F 8/61; G06F 8/65; G06F 9/44; G06F 9/50; G06F 11/267; G06F 11/27
See application file for complete search history.

(56) References Cited

U.S. PATENT DOCUMENTS

| 6,477,572 | B1 | 11/2002 | Elderton et al. | ............... | 709/224 |
| 6,662,312 | B1 * | 12/2003 | Keller et al. | .................. | 717/124 |
| 7,181,360 | B1 | 2/2007 | Nikolac et al. | | |

(Continued)

OTHER PUBLICATIONS

B. Bacci et al., An Environment for Structured Parallel Programming, 1997, [Retrieved on Dec. 19, 2013]. Retrieved from the Internet: <URL: http://link.springer.com/chapter/10.1007/978-94-011-5514-4_13> 16 Pages (219-234).*

(Continued)

*Primary Examiner* — Don Wong
*Assistant Examiner* — Anibal Rivera
(74) *Attorney, Agent, or Firm* — Louise Bowman; Jim Ross; Micky Minhas

(57) ABSTRACT

Environments for testing are deployed. A library of different topology groupings is provided. An interface is presented to a user for receiving environment definitions. Elements from the library of different topology groupings are automatically provided to the user for creating a test environment according to the received environment definitions. The platform delivers fully configured instantaneous topology deployments of all flavors for product development and testing efforts. The topology deployment service platform is used to create reliable topologies of varying layers of complexity, varying machine providers, different roles, different product builds, integration with partners and varying product configurations. The ability to launch and create multiple test and development environments trivially in an automated reliable fashion allows complicated customer scenarios and configurations to be deployed.

17 Claims, 8 Drawing Sheets

(56) References Cited

U.S. PATENT DOCUMENTS

| | | | |
|---|---|---|---|
| 7,299,451 B2 * | 11/2007 | Dygon et al. | 717/124 |
| 7,636,782 B2 | 12/2009 | Jordan et al. | 709/226 |
| 7,665,085 B2 | 2/2010 | Sundararajan et al. | 717/174 |
| 7,774,446 B2 | 8/2010 | Nedelcu et al. | 709/223 |
| 2003/0037327 A1 * | 2/2003 | Cicciarelli et al. | 717/178 |
| 2004/0243381 A1 * | 12/2004 | Kuturianu et al. | 703/22 |
| 2005/0283759 A1 * | 12/2005 | Peteanu et al. | 717/120 |
| 2006/0037002 A1 | 2/2006 | Vinberg et al. | |
| 2006/0112383 A1 * | 5/2006 | Chang et al. | 717/168 |
| 2007/0022324 A1 | 1/2007 | Chang et al. | |
| 2007/0136024 A1 * | 6/2007 | Moser et al. | 702/119 |
| 2007/0168970 A1 | 7/2007 | Li et al. | |
| 2008/0040455 A1 | 2/2008 | MacLeod et al. | 709/220 |
| 2008/0216006 A1 * | 9/2008 | Jordan et al. | 715/771 |
| 2009/0007074 A1 * | 1/2009 | Campion et al. | 717/124 |
| 2009/0235174 A1 * | 9/2009 | Royt | 715/735 |
| 2009/0249284 A1 * | 10/2009 | Antosz et al. | 717/104 |
| 2009/0271472 A1 * | 10/2009 | Scheifler et al. | 709/202 |
| 2010/0031247 A1 * | 2/2010 | Arnold et al. | 717/174 |
| 2010/0153916 A1 * | 6/2010 | Bhatkhande et al. | 717/120 |
| 2012/0017210 A1 * | 1/2012 | Huggins et al. | 718/1 |
| 2012/0166876 A1 * | 6/2012 | Zambrana | 714/32 |

OTHER PUBLICATIONS

Oracle®. "Oracle® WebLogic Integration." 10g Release 3 (10.3.1). Published Jan. 2010. 98 pages. http://download.oracle.org.com/docs/cd/E14981-01/wli/docs1031/pdf/deploy.pdf.

Microsoft | TechNet. "Depolyment overview (SharePoint Server 2010)." Retrieved Mar. 24, 2011. 8 pages. http://technet.microsoft.com/en-us/library/ee667264.aspx.

msdn® "Deployment Topologies for Reporting Services in SharePoint Integrated Mode." SQL Server 2008 R2. Retrieved Mar. 24, 2011. 8 pages, http://msdn.microsoft.com/en-us/library/bb510781.aspx.

International Search Report and Written Opinion mailed Jan. 30, 2013 in Application No. PCT/US2012/043899, 10 pages.

* cited by examiner

DEPLOYING ENVIRONMENTS FOR TESTING BY PROVIDING INSTANTANEOUS AVAILABILITY OF PREBUILT ENVIRONMENTS

FIELD OF THE INVENTION

This disclosure relates in general to software testing and deployment, and more particularly to a method, a system, and a computer readable storage device for deploying environments for testing by providing instantaneous availability of prebuilt environments.

BACKGROUND

Software is ubiquitous and touches almost everyone either directly or otherwise. Thus, software has the potential for wide reaching impact. A chief determinant of the nature of the impact of any software product hinges on the quality of the software produced. Accordingly, software testing, just like software development, is a valuable function of the process for producing quality software products. Software testing directly contributes to improving the quality of software by detecting defects and enabling such defects to be addressed before the product ships.

Software defects that are not detected, and consequently left un-addressed, result in user's experiencing some type of failure during operation of the software. These failures can have significant cost implications for the producer of the software, including the costs to address failure issues reported from customers and to issue patches, the loss of customer confidence and credibility, the loss or corruption of customer data, legal implications due to failure or non-compliance, etc. The consequences of releasing poorly tested software may be avoided by preventing and eliminating defects during software production. Preventing software defects from shipping involves a much smaller investment upfront compared to the cost incurred later in addressing those defects. Software testing also provides an objective, independent view of the software to allow the business to appreciate and understand the risks of software implementation.

Software testing normally occurs in several phases, for example, engineering test, development test, alpha testing, and beta testing. Numerous tools have been developed to facilitate software testing. These testing tools generally automate functional testing to ensure that applications work as expected. Moreover, software test tools can handle administration, reporting and sequencing of tests, and provide a common user interface for a test administrator to develop tests.

Many companies are moving to a centralized testing environment. A centralized testing environment provides process consistency through the consistent deployment of standard testing methodology and processes, which helps improve the quality and efficiency of testing. In addition, centralized testing environment provides benefits from economies of scale and centralized spending However, a centralized testing environment is becoming increasingly more difficult to maintain due to the numerous builds that are integrated into that one environment. As online services grow and dependencies become increasingly more tangled, having an easily targeted and deployed environment that developers can use to validate their fixes becomes critical. Being able to maintain multiple releases of a software product requires a rich testing environment to ensure a software patch or hot fix, i.e., quick fix engineering (QFE), and rollups are validated properly using test passes.

Currently, a tester may take about a week to deploy a multi-machine environment for testing software for developers. In addition, each of these kinds of components is accessed individually. Others have solved these problems using automated tasks to replicate the environment in real time after a user selects the choice, manually building configurations one at a time and stringing them together, and using different tools for each of the different tasks such as machine retrieval, followed by setup tools etc.

It can be seen then that there is a need for a method, a system, and a computer readable storage device for deploying environments for testing by providing instantaneous availability of prebuilt environments.

SUMMARY

To overcome the limitations described above, and to overcome other limitations that will become apparent upon reading and understanding the present specification, embodiments for a method, a system, and a computer readable storage device for deploying environments for testing by providing instantaneous availability of prebuilt environments are disclosed.

The above-described problems are solved by providing a comprehensive platform for delivering fully configured instantaneous topology deployments of all flavors for product development and testing efforts. The topology deployment service platform provides the ability to create reliable topologies of varying layers of complexity (single/multi-machine), varying machine providers (Physical/VM/Agile), different roles (AD, Exchange® etc.) different product builds, integration with partners and varying product configurations. The ability to launch and create multiple test and development environments trivially in an automated reliable fashion allows complicated customer scenarios and configurations to be deployed.

An embodiment includes a method for deploying environments for testing is disclosed. The method includes providing a library of different topology groupings, presenting an interface to a user for receiving environment definitions and automatically providing to the user elements from the library of different topology groupings for creating a test environment according to the received environment definitions.

In another embodiment, a system for deploying environments for testing is disclosed. The system includes a resource picker for providing a library of different topology groupings and configured to manage resources and to implement check-in and check-out of the resources, a primer for providing a suite of services for using resources to create topology building blocks for the library of different topology groupings and a client webpage interface for enabling users to provide environment definitions for creating a desired topology from the library of different topology groupings, wherein, upon receiving the environment definitions through the client webpage interface, the primer automatically providing to the user elements from the library of different topology groupings for creating a test environment according to the received environment definitions.

A computer readable medium including executable instructions which, when executed by a processor, provides a method for deploying environments for testing is disclosed. The computer readable medium includes instructions that are executable to provide a library of different topology groupings, present an interface to a user for receiving environment definitions, and automatically provide to the user elements from the library of different topology groupings for creating a test environment according to the received environment definitions.

These and various other advantages and features of novelty are pointed out with particularity in the claims annexed hereto and form a part hereof. However, for understanding the disclosed embodiments, the advantages, and the objects obtained, reference may be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments described herein are directed to a method, a system and a computer readable storage device for deploying environments for testing by providing instantaneous availability of prebuilt environments.

Figure 1:
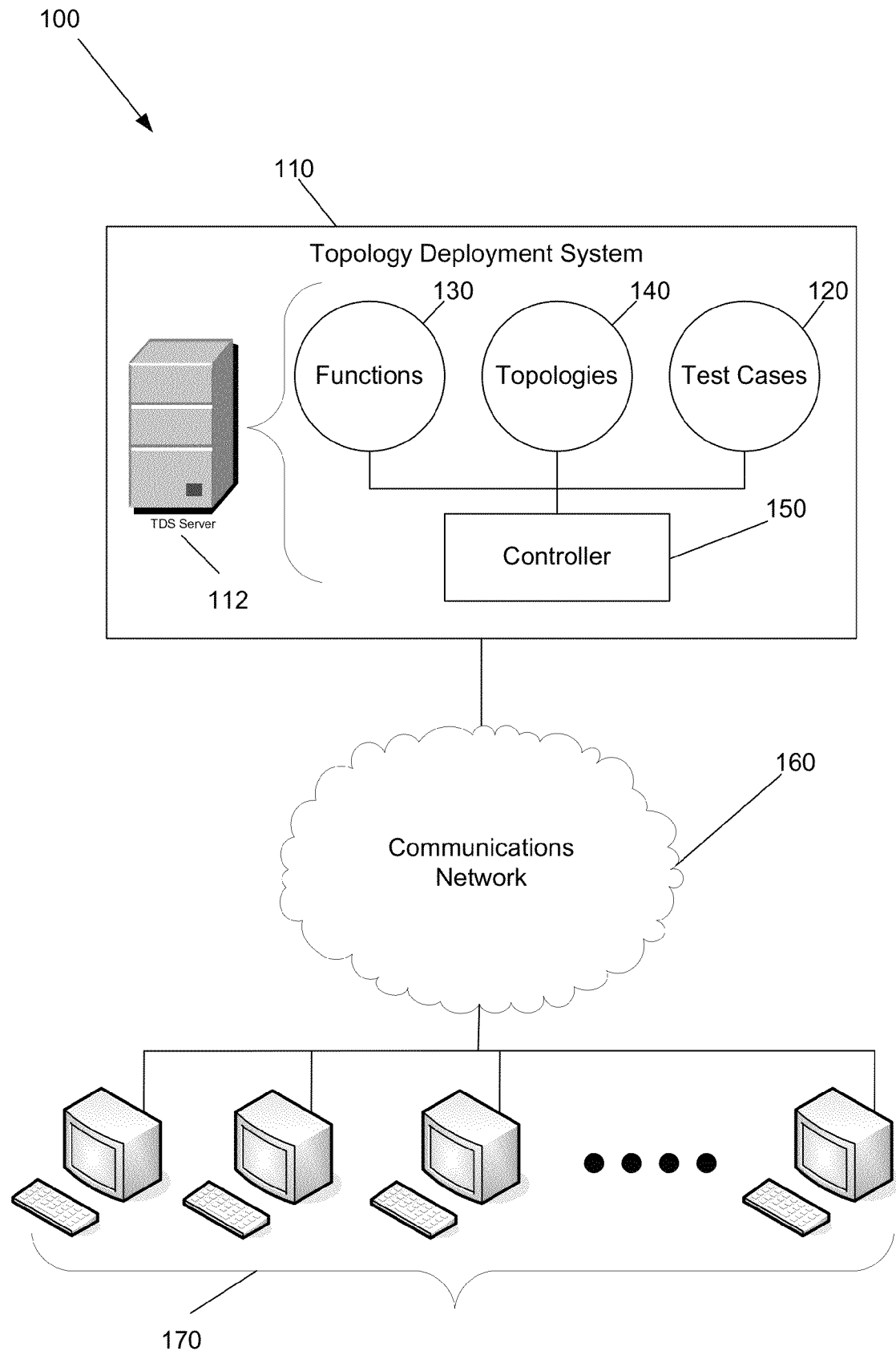
FIG. 1 is a block diagram of a topology deployment system configured for deploying environments for testing by providing instantaneous availability of prebuilt environments according to one embodiment.

FIG. 1 is a block diagram of a topology deployment system 100 configured for deploying environments for testing by providing instantaneous availability of prebuilt environments according to one embodiment. The data processing system can include a Topology Deployment Service (TDS) platform 110 configured for communicative coupling to one or more client computers 170 over a network 160. The TDS platform 110 can include a plurality of modules or components. In FIG. 1, a TDS server 112 presents a library of different topology groupings that may be automatically provided to the user. Elements from the library of different topology groupings presented by the TDS server 112 thus may be used by the user to create a test environment according to the received environment definitions. In FIG. 1, only a controller 150, functions database 130, topologies database 140 and pre-arranged test case database 120 for the TDS platform 110 are shown. A more detailed description of the TDS platform 110 will be described below. The TDS platform 110 provides an interface to users at the client computers 170 for accessing, configuring, and deploying various topologies.

The TDS platform 110 provides a comprehensive platform for delivering fully configured instantaneous topology deployments of all flavors for product development and testing efforts. The TDS platform 110 provides the ability to create reliable topologies of varying layers of complexity (single/multi-machine), varying machine providers (Physical/VM/Agile), different roles (AD, Exchange® etc.) different product builds, integration with partners and varying product configurations. The ability to launch and create multiple test and development environments trivially in an automated reliable fashion allows complicated customer scenarios and configurations to be deployed.

For example, the TDS platform 110 provides support for multiple variations of topologies. Both developers and testers may work on and validate work-items, features, and/or bugs via the client computers 170. The TDS platform 110 allows teams to integrate multiple products into a single test environment. Further, service teams may use the TDS platform 110 to work with multiple partners and configurations, and enterprise teams may work with multiple partners. Topologies for manual or automated test passes are also supported. In addition, program managers may use the platform as environment for providing topology deployment demonstrations.

The TDS platform 110 also provides a uniform language and mechanism for all teams to deploy environments, thus streamlining collaboration with other components, partner teams, and products. The power of the platform is further reinforced by the fact that these topologies are available instantaneously. An additional value to the platform is that only successful topology build outs are provided to the user. The TDS platform 110 is structured as a service allowing for this capability to be extended to multiple teams with their own topologies and resources.

Embodiments of the TDS platform 110 provide instantaneous access to topologies database 140, the ability to distinguish pre-perception line tasks from the end user, the ability to provide different machines based on different workload requirements, the ability to author multiple building blocks and surface them as re-usable entities, and the ability to use multiple machine providers for resources.

Figure 2:
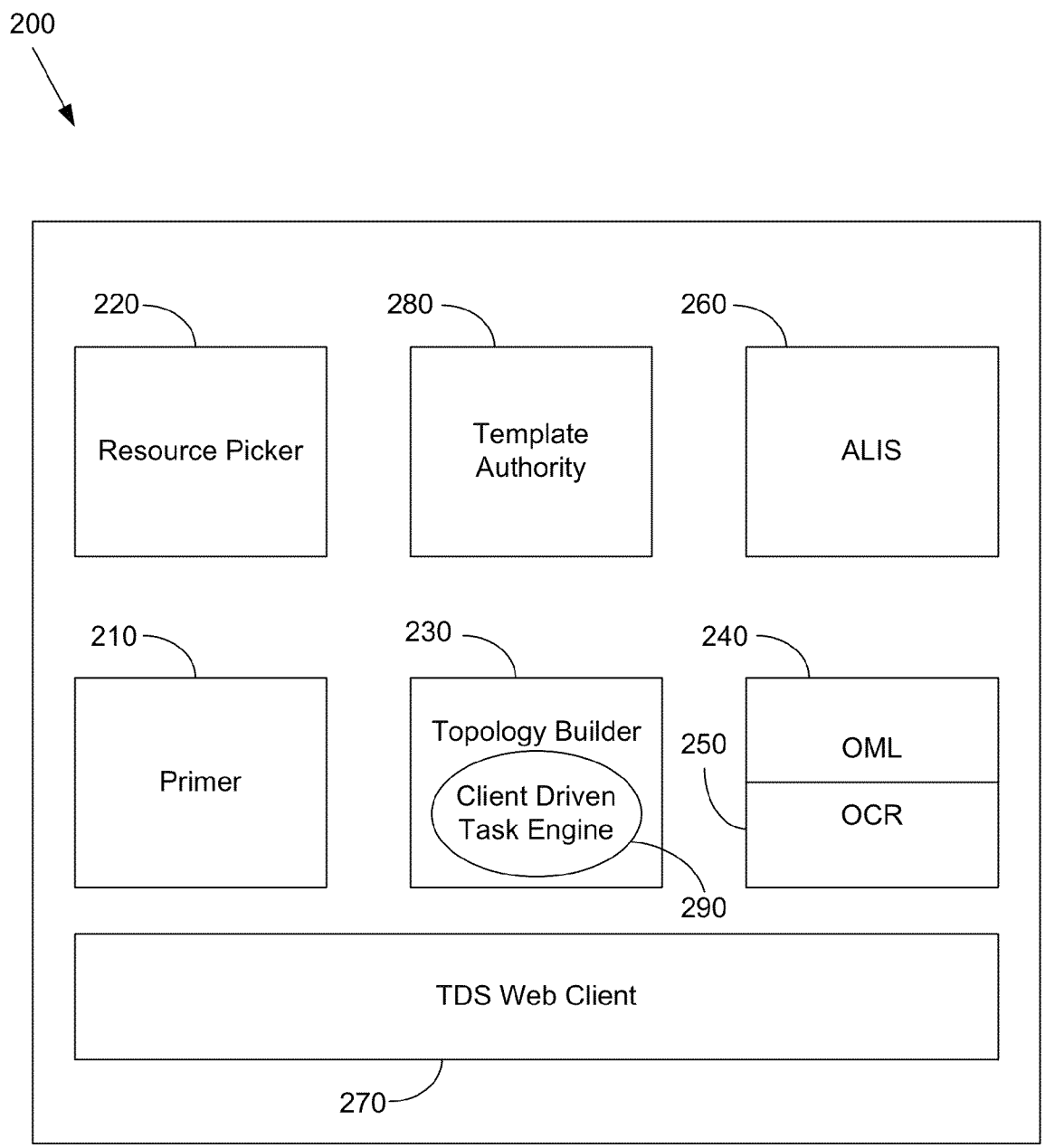
FIG. 2 is block diagram of the components/modules of the topology deployment server (TDS) platform according to an embodiment.

FIG. 2 is block diagram of the components/modules of the TDS platform 200 according to an embodiment. The TDS platform 200 is a system that allows the user to deploy environments for testing by providing instantaneous availability of prebuilt environments. The TDS system 200 includes multiple layers, modules or components providing different functionality that results in a comprehensive solution, including a Primer 210, a Resource Picker 220, a Topology Builder 230, an OML (Orphaned Machine Locator) tool 240, an OCR (Orphaned Client Recovery) tool 250, an ALIS (All Labs Integration Services) system 260, a TDS Web Client 270 as a front end interface, and Template Authority 280.

Primer 210 provides a suite of services for pre-building resources out to common topology building blocks. The Resource Picker 220 is a central manager for virtual and physical machines, along with other resource types, such as phones, Linux® boxes, IP Addresses etc. The Resource Picker 220 acts as a manager for all resources and implements check-in and check-out of resources. Resources can be machines, IP addresses, anything that a topology needs to deploy.

The Topology Builder 230 uses a generic client driven task engine 290 to deploy topology environments. The OML tool 240 and the OCR tool 250 provide a collection of tools and services used to locate and re-provision orphaned resources in the environment due to software or hardware failures. The ALIS system 260 is a service that manages a team's virtual machines (VMs) along with VM endpoints, such as Agile labs. Agile Labs is a resource provider that provides machines and VMs for teams. The ALIS system 260 manages VMs, by taking a snapshot and reverses the process as needed. The ALIS system 260 also works with other external resource environments to check out resources if more resources are needed.

The TDS Web client 270 provides a client front end structured as web pages that provides a management user interface for end-users to check-out and check-in topologies. The Template Authority 280 provides a common language and development platform that is used to represent configurations as re-usable building blocks that create rich topologies. The Template Authority 280 is provided for each of the environments, wherein an XML-based template defines the topology.

Primer 210 represents a suite of services that pre-build resources out to common topology building blocks. If the problem is imagined as a retail supply chain, then Primer 210 acts as the stock boy running back and forth to the stock room and bringing out more products to put on the shelves so that when a user needs a topology building block, that topology building block is right there waiting.

The Primer 210 mitigates unreliable deployments through repetition. If a Windows® 2008 R2 server is needed that implements a domain controller with a SQL Server® and a Rights Management Server and Client installed, Primer 210 will keep retrying to create that environment regardless of how many times the setup fails. Primer 210 continues working and building topologies at all times so that the topology building blocks are ready at any time.

Primer 210 usually does not try to fully configure a machine in a single step. Rather, the Primer 210 uses multiple layers of steps to create the environments desired, which is referred to as "staged deployment." The idea is basically a way of thinking about the pool structure inside Primer 210 and the paths an administrator defines between those pools in order to have the right end points sitting around ready for work all the time.

The pool structure of Primer 210 is most powerful when structured in this multi-layer format. The first layer usually establishes the base platform. Using a Windows® machine as an example, a multi-partitioned machine, and the first layer creates and uses the second partition to install another copy of Windows® that will be the test environment. The second layer is then used for more specialized configurations that take place on top of that platform. In the case of Windows®, elements such as the domain controller creation or SQL Server® install usually occur at this point.

For the Topology Deployment Services environment, a third layer takes the more customized configurations and turns them into fully pre-installed test environments. Using Office 365 teams as an example, this process usually includes installing Exchange®, Windows Live® online services, BOS online services, etc. Thus, a user wants a topology building block, one is already configured and ready to go with a simple, quick check-out. Additionally, this layered structure provides additional jumping points for checking out from in the event a new environment is to be created.

Primer 210 uses two underlying subsystems to accomplish its work, Resource Picker 220 and Topology Builder 230. The Primer 210 uses the Topology Builder 230 and Resource Picker 220 to take machines that are available and move them to predefined places where the resources are needed. For example, if a grouping of three machines is needed, Topology Builder 230 is configured to build the three machines, and Primer 210 uses the Resource Picker 220 to check out those three machines, inject a job into the Topology Builder 230 to provide the desired grouping. This process is repeated all day long, every day, for every configuration the system needs. In other words, the Primer 210 automatically checks and monitors, as well as builds, the groupings needed.

For example, a user accesses a front end using the TDS Web client 270, which may be a web page, such as the TDS Web, and requests a current version of Exchange®. A topology is obtained that has today's version of the Exchange® product. The Exchange® product is already installed and ready to use for as long as the user needs it. After the Exchange® product is checked-out, the system performs an update and identifies that an environment is missing. For example, the target number of Exchange® products maintained may be 50, but now only 49 of today's Exchange® products are available. Thus, another environment is built. The system accesses a Template Compiler (see Template Compiler 310 in FIG. 3) to obtain a template for building another one of today's Exchange®. The template provides the instructions for how one of today's Exchange® is built. The system accesses the Resource Picker 220 and identifies a machine for deploying the template.

The Resource Picker 220 is used to keep track of the current state of all the resources. The Primer 210 treats the Resource Picker 220 as the current inventory of the system and bases decisions on what to create next by comparing pool configurations of what is needed and what the Resource Picker 220 indicates as being currently available. The Resource Picker 220 thus provides a resource and instructs the Topology Builder 230 to deploy that template.

For example, when the Topology Builder 230 begins implementing a copy of today's Exchange®, if the process succeeds, then the system verifies that the needed number of topologies is available again, e.g., 50 of these topologies may be needed. If the process fails, the OML tool 240 and the OCR tool 250 are initiated to repair it. If the device is a physical machine, the box is re-provisioned. If the device is a virtual machine running on a host, the system knows how to interact with that virtual machine, and the ALIS system 260 is used to repair the VM by taking a snapshot, stopping the VM, and restarting the VM. Once the VM comes back on line, Primer 210 knows how to start interacting with the machine again.

Topology Builder 230 is the execution engine. When the Primer 210 needs to create or replace a particular type of resource, the Primer 210 creates a Topology Builder 230 work order which will transform a resource into the desired state. The Primer 210 queries the Resource Picker 220 for a machine to transform and then tells the Topology Builder 230 to transform that machine according to the steps in that work order.

Topology builder 230 can interact with virtual machines (VMs), which can be image-based, or Topology Builder 230 can interact with a wide array of physical machines that may need a test environment plugged into it. Some of the VMs are static and may select the resource by name so that an endpoint to reference is provided. Others are more like Windows® machines that may be built remotely from scratch, if needed.

If the developer wants a test topology that has, one or two servers, one AD and one Exchange® and possibly another one for SharePoint®, etc., the components, and possibly the topology itself, may be prebuilt. If a developer is about to check-in some code, before the code is checked-in and breaks the intubation between Exchange® and SharePoint®, validation is performed to ensure builds exists and tests are run. To run these tests, the machine runs the topology. This exact system could also be used to rent these topologies to validate software or to build in-house solutions.

A virtuous cycle of highly available deployment resources is maintained in the TDS system 200 through the OML (Orphaned Machine Locator) tool 240, the OCR (Orphaned Client Recovery) tool 250, and the ALIS (All Labs Integration Services) system 260. These three systems provide a high degree of confidence that no matter what state a resource gets into, the TDS system 200 will auto-correct and pull it back in quickly and efficiently without human interaction.

The services provided by the OML tool 240 are used to identify any deployment resource that gets 'lost' or 'orphaned' in the TDS system 200, and hands the resource off to an appropriate subsystem for automatic recovery. This process used to be an expensive manual process. However, OML tool 240 automates the process with an extensible SQL rule set to detect orphaned resources anywhere in the infrastructure.

Working in conjunction with OML tool 240, the services provided by the OCR tool 250 are used to manage recovering orphaned physical resources. The mode of attack for a physical resource in an unknown or lost state is to re-image it completely, and re-add it to the TDS system 200 once complete by virtue of a configured RunOnce. If any failure is hit during the re-imaging, the OCR tool 250 opens a SCOM Alert with relevant machine information, asset number, and lab location to be investigated by the operations team.

The service of the OCR tool 250 are used to remotely re-image resources by writing Windows® Deployment Services (WDS)-specific settings to the machine account in the infrastructure active directory (IAD), and then rebooting the machine. These settings trigger the machine to contact the infrastructure WDS server and automatically install a specified image onto the machine the next time the machine is rebooted or powered on.

For a machine that is not reachable for any reason (lost network connectivity, powered off, etc), OCR tool 250 sends a SOAP request to a registered Web Service that hard power cycles the machine remotely thereby ensuring that a hard reboot may be forced for any reason and at any time. The OCR tool 250 and OML tool 240 close the loop on any lost physical resource in the TDS system 200 to maintain high test resource availability at all times The ALIS system 260 is a standalone system that includes of 3 plug-in services that manage every virtual machine (VM) in the TDS system 200. The services are engineered in such a way that a user can check-out, check-in, snapshot the configuration, and revert any VM from any source provided a VM provider plug-in is implemented from the base class and added to the configuration of the ALIS system 260. A new VM provider plug-in may be created without service modifications. Supported VM providers in the TDS system 200 may include Agile Labs, Virtucon (Exchange® Hosted VMs), and partner teams VMs using the Virtucon format and Azure®. Of course the present embodiments are not meant to be limited to the VM providers listed above.

When the TDS system 200 needs additional resources for any reason, the ALIS system 260 can be triggered to check-out VMs from any specified source. Once provisioned, the VMs are automatically added to a stack representing a deployment environment of the TDS system 200 and a requested Silo.

A Silo is a construct for isolating teams from each other and ensuring the right set of resources are allocated to the proper teams. This further provides a structure for the service to allow partners to have their own quotas, their own machines, and their own environments outside of what would be used by the normal development team.

Thus, a provision may be automatically added to the stack of the TDS system 200 and the requested Silo. Using team resource allocation as an example, there may be three development teams: the Exchange® team, the Windows® team, and the SharePoint® team. A hundred resources may be accounted to the Exchange® team. If a user accesses the TDS system 200 and wants to check out a test environment while in Exchange®, the user checks a test environment out from Exchange®. In other words, people in Windows® are not allowed to check out from Exchange® without permission. For the Agile Labs model, billing is incorporated into each request to ensure that the appropriate teams are billed for their resource usage only.

When a virtual machine (VM) needs to be recovered for any reason, e.g., a user released a topology, or a VM is identified by the OML tool 240, the ALIS system 260 unregisters the VM from the TDS system 200, reverts the VM to a configured base snapshot, and the VM automatically re-enters the infrastructure in a clean state by virtue of a configured RunOnce step. This workflow takes on average 1-3 minutes for the machine to be back and ready in the TDS system 200, where re-imaging a physical resource take upwards of 15-30 plus minutes.

Thus, the TDS system 200 watches the Resource Picker 220 and the Topology Builder 230 for various different symptoms, such as when a Windows® machine is being built to include a domain controller, and the machine reboots but hangs during the rebooting. If the machine does not recover and communicates with the TDS system 200 within a predetermined period of time, the OML tool 240 will note this and take the machine back for re-provisioning. This is where OCR tool 250 begins. The OCR tool 250 knows how to clean up the machine's records. Thus, the OCR tool 250 cleans that machine using Resource Picker 220 and Topology Builder 230 so that when the machine comes back, it will work properly and trigger a reinstall of Windows® if it is a physical box, or, if it is a virtual machine, it instructs the ALIS system 260 to get rid of this VM. The ALIS system 260 will either check-in the VM and destroy the VM, or revert the VM to a known good state and bring it back on line. If a physical resource has been out of the TDS system 200 for awhile, e.g., a hard drive issue, the OCR tool 250 can reboot the box in some instances using remote hardware. Thus, the OCR tool 250 tries to push the machine through with no human interaction. Only if the attempt fails does a user have to physically touch the box. Monitoring is built into the OCR tool 250 that alerts operations if the OCR tool 250 fails to successfully re-provision a resource.

When a developer is done using a topology in TDS, the developer accesses the web page and checks it in. If it is a VM, the system will immediately mark properties in the Resource Picker 220, the ALIS system 260 watches for those that have been released. The ALIS system 260 will either reclaim the machine by stopping the virtual machine, regardless of which virtual machine provider that is associated with the virtual machine. The virtual machine may be from an internal host, from the internal Agile Labs service, or from any VM provider that the ALIS system 260 accesses. Depending on which VM provider, the ALIS system 260 can stop the VM, revert it to a known state and start the VM. If the OCR tool 250 detects the VM is lost, the OCR tool 250 triggers the ALIS system 260 to initiate cleaning of VMs. Controls may be issued to the VM provider. If the VM a host directly, the ALIS system 260 may contact the VM host and instruct the VM host to stop the particular VM, revert the VM to snapshot, and start the VM. Alternatively, if the VM is a service like Agile Labs, the ALIS system 260 instructs Agile Labs to revert the VM. A watcher service observes all requests to ensure a request is not dropped. For example, if Agile Labs has been instructed to revert a VM, but it has been too long since Agile Labs was instructed without the VM being reverted, the watcher server sends a new request. The ALIS system 260 can go and get VMs from resources. If there is a new resource provider that is able to provide new virtual machines, a new plug-in may be added to allow the ALIS system 260 to make the request to the new provider.

Figure 3:
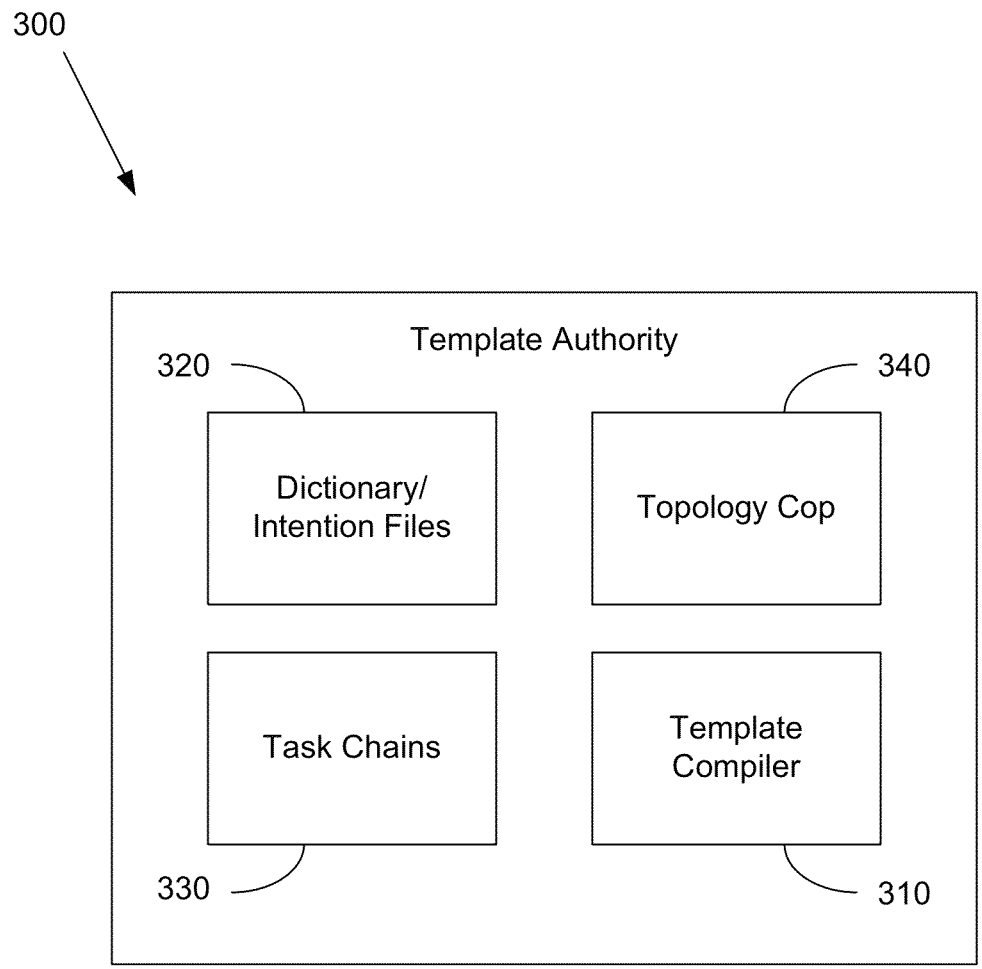
FIG. 3 illustrates a block diagram of a template authority according to an embodiment.

FIG. 3 illustrates a block diagram of a Template Authority 300 according to an embodiment. The Template Authority 300 provides rich scenarios by using a common language and development mechanism to represent different building blocks that then may be combined. The common language and development mechanism are provide through the use of a Template Compiler 310, dictionaries/intention files 320, task chains 330 and a topology cop 340, i.e., for template validation.

Task chains 330 are logical groups of tasks tied together that result in a topology fragment. Dictionaries/intention files 320 describe what a topology will look like with references to the task chains 330 and other variables that will be substituted with the latest version of the desired tasks when built. Template compiler 310 and topology cop 340 provide the checks to ensure accuracy of the resultant topology.

This Template Authority 300 allows quick creation of rich and complex scenarios that span multiple machines, different configuration and provides instantaneous reliable environments to a software development and test team. With regard to the task chains 330, when multi-machine environments are built, member machines join that domain. Obviously, a domain is created before a member joins the domain. If there are four machines built out and one is the domain controller, the other three are member machines that join that domain. The three machines would wait until the active directory is created. As soon as the active directory is created, then the three machines continue with their tasks. This can be built out to any other dependencies needed during a deployment.

The task chains 330 involve defining reusable building blocks. For example, if the sequence of events to create a domain controller is known, task chains 330 may be used to define reusable blocks so other developers do not have to reinvent the same blocks over and over again. A domain controller may be defined and multiple different implementations of test environments can reuse that building block. Thus, task chains 330 facilitate defining common tasks for reusability and provide a quick and easy way to create these multiple machine environments and synchronize the events so that events are not occurring out of order.

The topology cop 340 performs validation once these environments have been compiled. The topology cop 340 is a tool that topologies are run against to validate them so that when the topology is injected into the environment, the validated topology will actually work. This saves resources from being wasted. For example, if a task chain 330 has a required setting that was not specified, the topology cop would detect the unspecified setting and notify the developer that the setting was not set.

Figure 4:
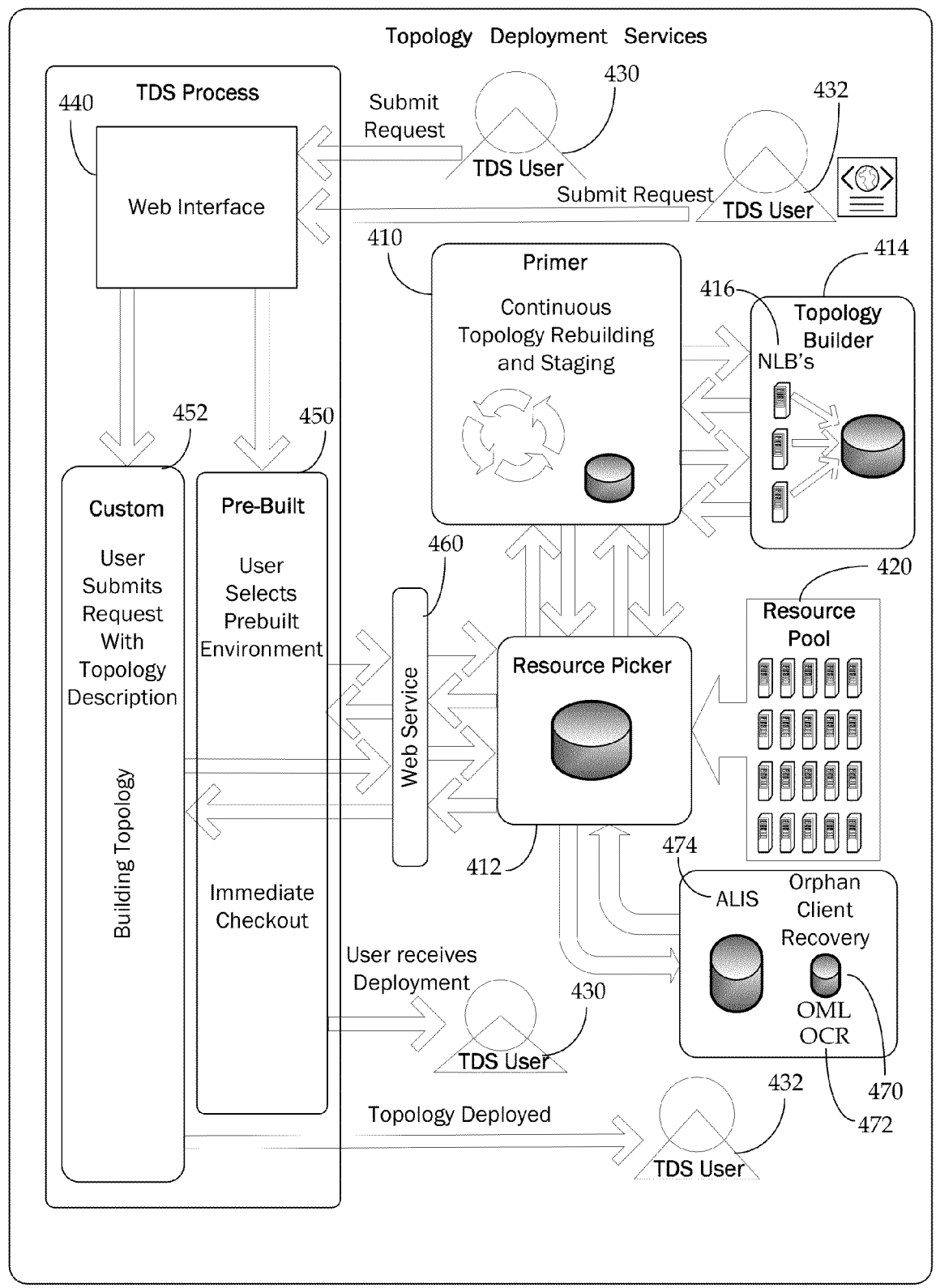
FIG. 4 is a detailed block diagram of the Topology Deployment Services (TDS) system according to an embodiment.

FIG. 4 is a detailed block diagram of the Topology Deployment Services (TDS) system 400 according to an embodiment. In FIG. 4, a Primer 410 provides a database and a suite of services, wherein each perform a single simple task. The Primer 410 provides well known stages/pools that offer common building blocks needed for topology deployments. Primer 410 provides a suite of services for pre-building resources out to common topology building blocks and acts as a central manager for virtual and physical machines, along with other resource types, such as phones, Linux boxes, IP Addresses etc. Primer provides management over all resources and implements check-in and check-out of resources. Unreliable deployments are mitigated by the Primer 410 through repetition and through the use of multiple layers of steps to create the desired environments.

Primer 410 is coupled to a Resource Picker 412. Resource Picker 412 takes machines that are available and moves the machines to predefined places where the resources are needed. Primer 410 is also coupled to a Topology Builder 414. The Topology Builder 414 uses a generic client driven task engine to deploy topology environments. NLBs 416 are used to provide high availability and high reliability.

The Resource Picker 412 is also coupled to a resource pool 420, which provides a static group of machines configured the same way. Each Pool has a Goal or target number that Primer 410 tries to keep at all times. For example, if the Basic Domain's target is 100 machines and there are only 99, it starts making the 100th.

Primer 410 moves machines according to "Transitions," which define a defined path from A to B. Each Transition has a Source and Destination "Pool" associated therewith, and each Transition has a "Definition." Definitions may be implemented as "Topology Lookups" using DART API to create Topology Builder XML files. States may be updated using Scan Resources as the "Primer callback" mechanism to allow it to detect machines in Topology Builder 414 that are moving from A to B. Parameters for "Priority" and "Precious Resources" are used to establish a preferred process order. Priority refers to what is the most important pool to have online, whereas Precious Resource refers to pools that have lower numbers and therefore could be starved by higher utilization pools.

For example, prioritization of resources in the resource pool 420 may be configures with Priority set to "Process Order," wherein each pool has a process order and each transition has a process order. Layers and pools are processed in "Reverse Order," which causes more reactive churn. Settings based on "Precious Resource" approach may include processing Workgroup before Domain, Windows® 2003 before Windows® 2008, and Loc/Sandbox before Official. Threshold modifiers may also be used. Threshold modifiers provide temporary adjustments to compensate for "abnormal" behavior and have expiration times so the system flips back to normal. Threshold modifiers may also increase or decrease both Max and Min target values.

In operation, users 430, 432 submit requests 434, 436, respectively, using a TDS Web Client Interface 440. Pre-built 450 or custom 452 environments may be requested by users 430, 432. The TDS Web Client Interface 440 provides a client front end structured as web pages that provides a management user interface for users 430, 432 to check-out and check-in topologies. In the case of a request for pre-built environments 450 by user 430, the request 434 is passed by Web Services 460 to Primer 410. Primer 410 uses the Resource Picker 412 to check out the requested resources from Resource Pool 420. Topology Builder 414 begins to build replacement resources as described above. The resources obtained by the Resource Picker 412 are then provided to user 430.

In the case of a request for custom environments 452 by user 432, the request 436 is passed by Web Services 460 to Primer 410. Primer 410 injects a job into the Topology Builder 414 to provide the desired grouping. Primer 410 automatically also checks and monitors the groupings needed, keeps track of the current state of all the resources, treats the Resource Picker 412 as the current inventory of the system and bases decisions on what to create next using pool configurations of what is needed and what the Resource Picker 220 indicates as being currently available. Resource Picker 412 provides a resource and instructs the Topology Builder 414 to deploy an appropriate template for authoring the requested resource. More specifically, Primer 410 creates a work order Topology Builder 414 that will enable the Topology Builder 414 to transform a resource into the desired state. Primer 410 queries the Resource Picker 412 for a resource to transform and then instructs the Topology Builder 414 to transform that resource according to the steps in the provided work order. OML (Orphaned Machine Locator) tool 470, the OCR (Orphaned Client Recovery) tool 472, and the ALIS (All Labs Integration Services) system 474 ensure states of resources provided to user 432 are correct.

Figure 5:
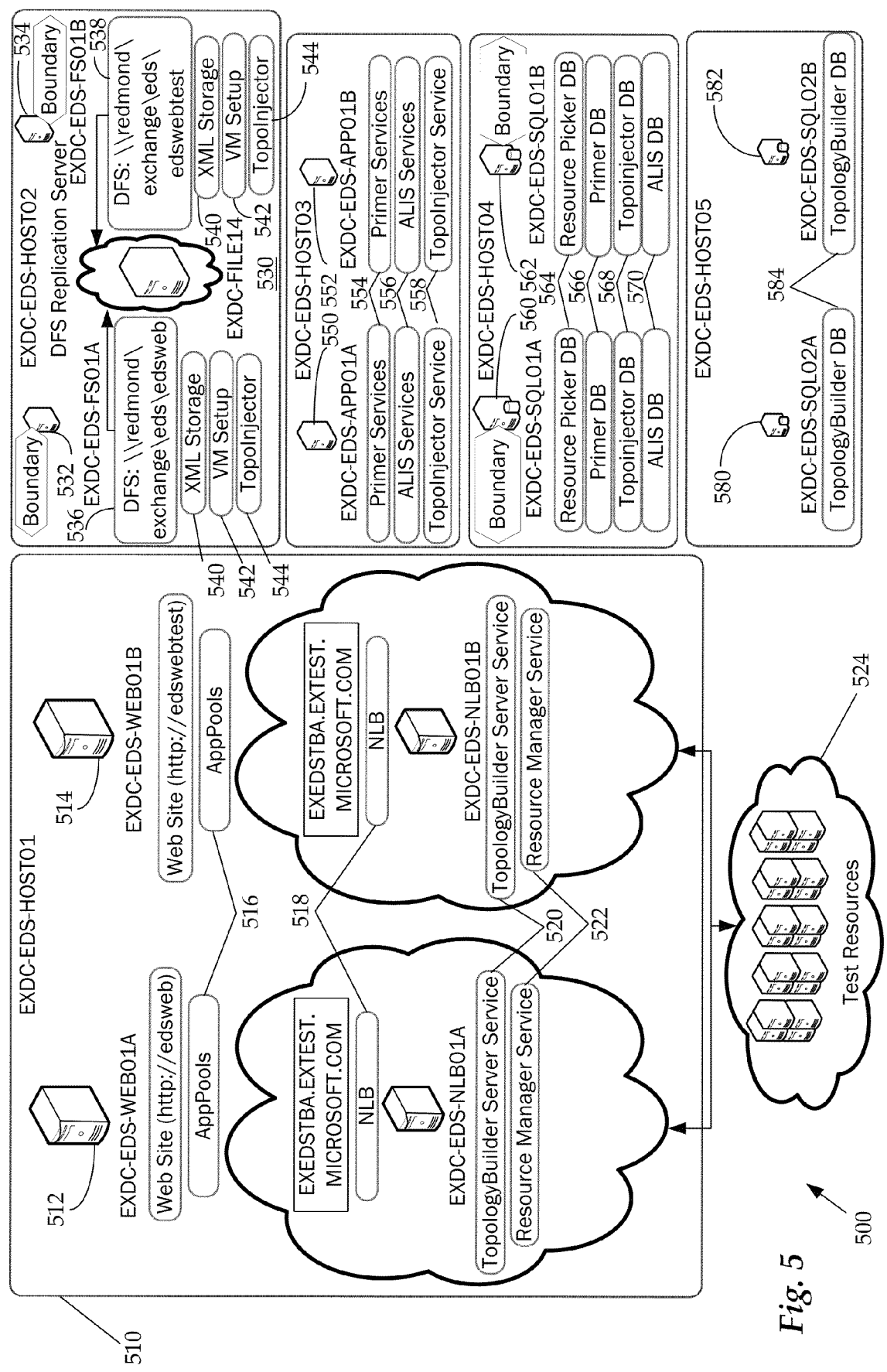
FIG. 5 is a diagram of a TDS stack according to an embodiment.

FIG. 5 is a diagram of a TDS stack 500 according to an embodiment. In FIG. 5, the TDS stack 500 includes five deployed topology environments. The first environment 510 includes two Web Servers 512, 514. Each Web Server 512, 514 includes application pool 516, NLB server 518, Topology Builder Server Service 520 and Resource Manager Service 522. Test Resources 524 are also provided to enable testing of the Web Servers 512, 514. In addition, a topology for Distributed File System (DFS) replication 530 is provided. DFS Replication services are included on each file server 532, 534. For each file server 532, 534, a domain 536, 538 is provided along with XML storage 540, virtual machine (VM) setup 542 and a Topology Injector services (TopoInjector) 544.

Two application servers 550, 552 are provided in the TDS stack 500. Each application server 550, 552 includes Primer services 554, ALIS services 556 and Topology Injector services (TopoInjector services) 558. The two SQL Server® 560, 562 include a Resource Picker database 564, a Primer database 566, a Topology Injector (TopoInjector) database 568, and an ALIS database 570. SQL Server® 580, 582 include only Topology Injector (TopoInjector) database 584.

Figure 6:
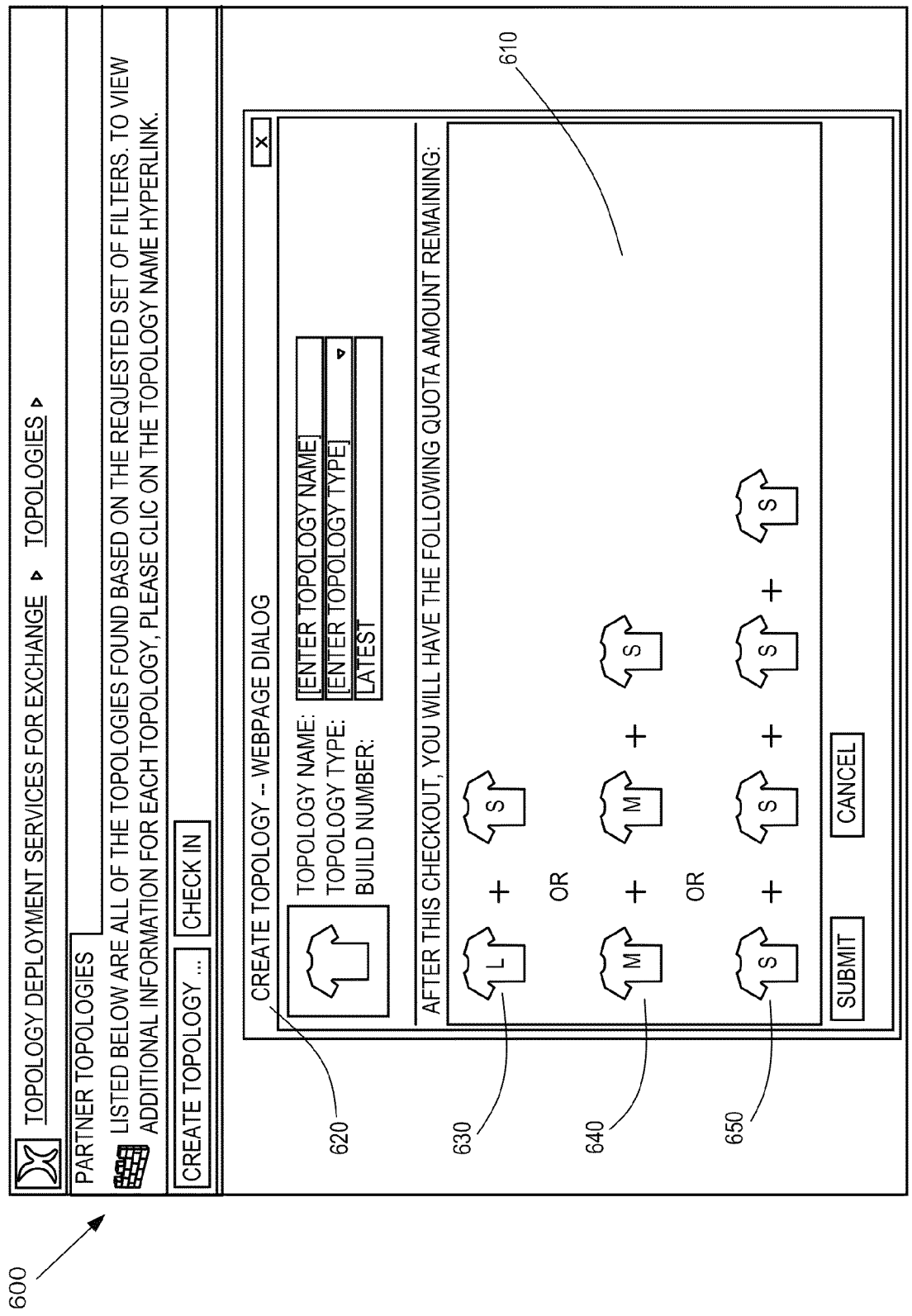
FIG. 6 illustrates a TDS Web client front end according to an embodiment.

FIG. 6 illustrates a TDS Web client front end 600 according to an embodiment. The TDS Web client front end 600 is structured as web pages that provide the ability to check-out topologies by end-users. In FIG. 6, a webpage dialog screen 620 is shown. A listing of topologies 610 are shown within the webpage dialog screen 620 that match a set of filters chosen by the user. The user is able to view further information associated with each topology by selecting one of the topologies 610. Within the webpage dialog screen 620, different quotas 630, 640, 650 are shown based on the topology that is checked out by the user.

Figure 7:
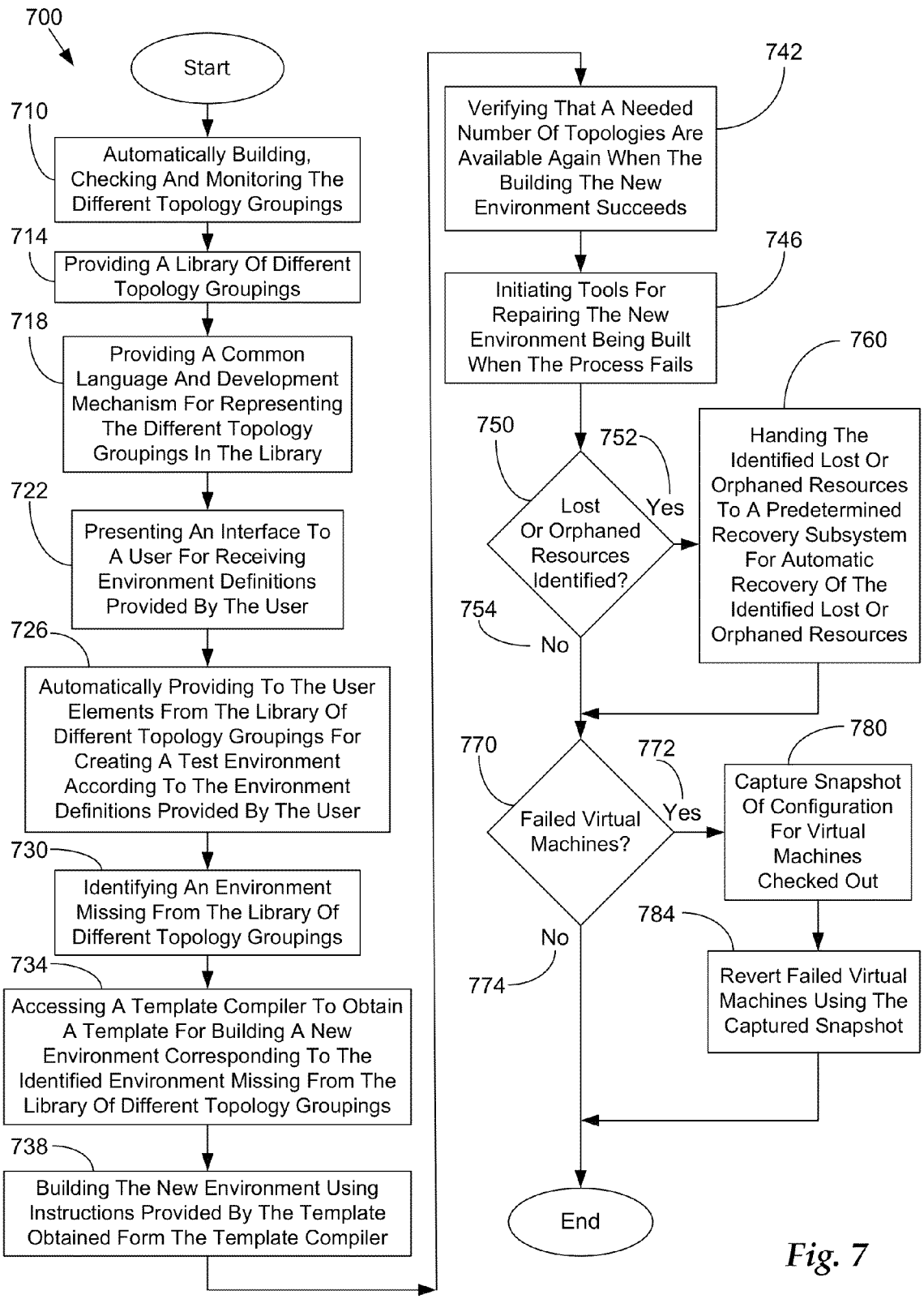
FIG. 7 is a flow chart of a method for deploying environments for testing by providing instantaneous availability of prebuilt environments according to an embodiment.

FIG. 7 is a flow chart 700 of a method for deploying environments for testing by providing instantaneous availability of prebuilt environments according to an embodiment. In FIG. 7, building, checking and monitoring the different topology grouping is automatically performed 710. A library of different topology groupings is provided 714. A common language and development mechanism is provided for representing the different topology groupings in the library 718. An interface is presented to a user for receiving environment definitions provided by the user 722. Elements from the library of different topology groupings are automatically provided to the user for creating a test environment according to the environment definitions provided by the user 726. An environment missing from the library of different topology groupings is identified 730. A template compiler is accessed to obtain a template for building a new environment corresponding to the identified environment missing from the library of different topology groupings 734. The new environment is built using instructions provided by the template obtained form the template compiler 738. Verification that a needed number of topologies are available again when the building the new environment succeeds is performed 742.

Tools for repairing the new environment being built when the process fails are initiated 746. A determination is made whether lost or orphaned resources are identified 750. If yes 752, the identified lost or orphaned resources are handed off to a predetermined recovery subsystem for automatic recovery of the identified lost or orphaned resources 760. If no lost or orphaned resources are identified 754 at decision operation 750 or after identified lost or orphaned resources are handed off to a predetermined recovery subsystem at 760, a determination is made whether there are any failed virtual machines 770. If yes 772, a snapshot of a configuration for virtual machines checked out is captured 780. Then, failed virtual machines are reverted using the captured snapshot 784. If a determination is made at 770 that there are no failed virtual machines 774 or after failed virtual machines are reverted at 784, the method 700 ends.

Figure 8:
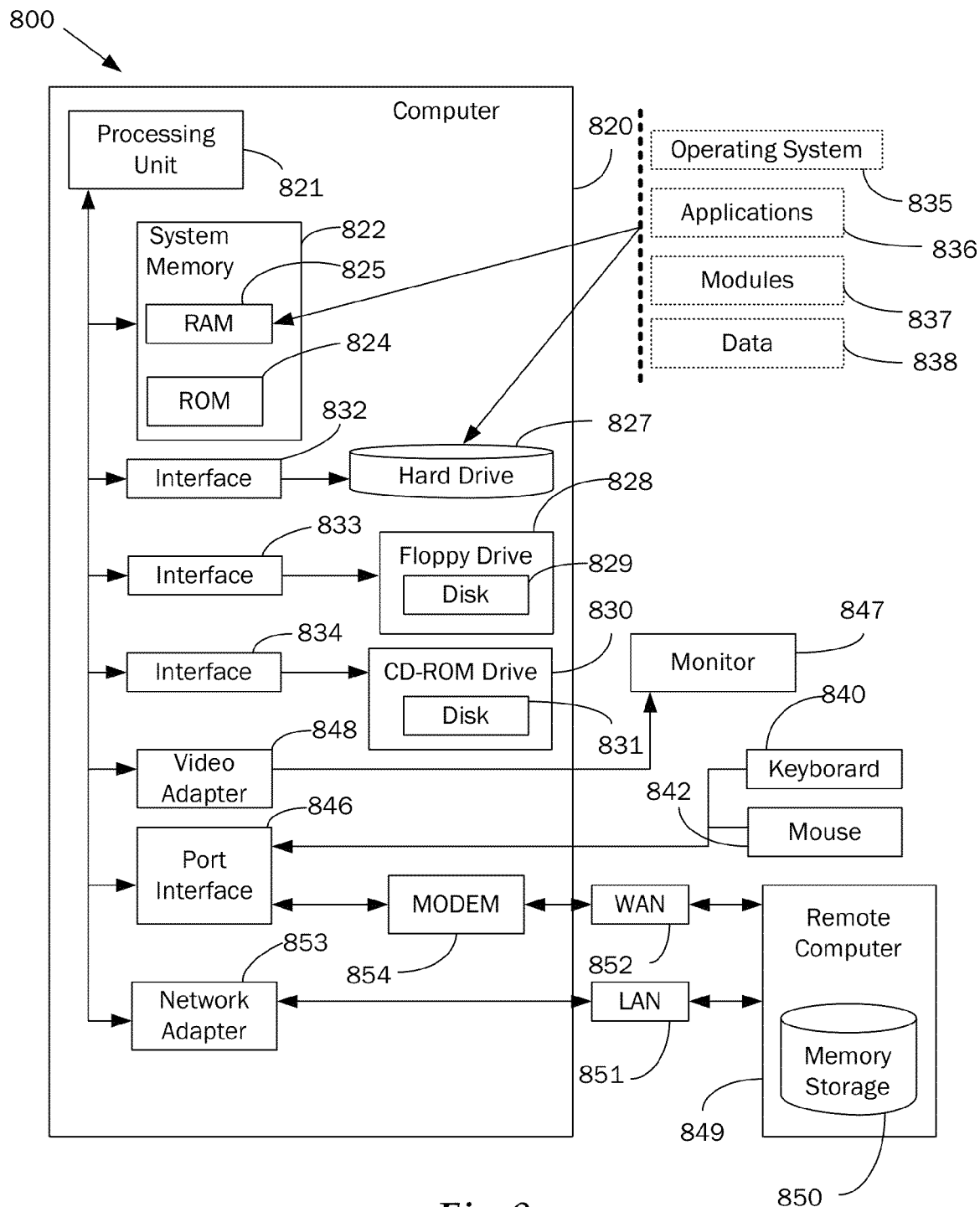
FIG. 8 illustrates a computing environment according to an embodiment.

FIG. 8 illustrates a computing environment 800 according to an embodiment. In order to provide a context for the various aspects of the different embodiments, FIG. 8 and the following discussion are intended to provide a brief, general description of a suitable computing environment 800 in which the various aspects of the embodiments may be implemented. While the embodiments have been described above in the general context of computer executable instructions of a computer program that runs on a computer and/or computers, those skilled in the art will recognize that embodiments may also be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like.

The illustrated aspects of the embodiments may also be practiced in distributed computing environments where tasks are performed by remote processing devices that are linked through a communications network. However, some, if not all aspects of the embodiments can be practiced on stand-alone computers. In a distributed computing environment, program modules may be located in both local and remote memory storage devices.

With reference to FIG. 8, a system for implementing the various aspects of an embodiment includes a computer 820, including a processing unit 821, a system memory 822, and a system bus 823 that couples various system components including the system memory to the processing unit 821. The processing unit 821 may be any of various commercially available processors. It is to be appreciated that dual microprocessors and other multi-processor architectures also may be employed as the processing unit 821.

The system bus may be any of several types of bus structure including a memory bus or memory controller, a peripheral bus, and a local bus using any of a variety of commercially available bus architectures. The system memory may include read only memory (ROM) 824 and random access memory (RAM) 825. A basic input/output system (BIOS), containing the basic routines that help to transfer information between elements within the computer 820, such as during start-up, is stored in ROM 824.

The computer 820 further includes computer-readable data storage media, such as a hard disk drive 827, a magnetic disk drive 828, e.g., to read from or write to a removable disk 829, and an optical disk drive 830, e.g., for reading from or writing to a CD-ROM disk 831 or to read from or write to other optical media. The hard disk drive 827, magnetic disk drive 828, and optical disk drive 830 are connected to the system bus 823 by a first interface, such as hard drive interface 832, a magnetic disk drive interface 833, and an optical drive interface 834, respectively. The drives and their associated computer-readable data storage media provide nonvolatile storage of data, data structures, computer-executable instructions, etc. for the computer 820. Although the description of computer-readable data storage media above refers to a hard disk, a removable magnetic disk and a CD, those skilled in the art will understand that other types of media which are readable by a computer, such as DVDs, magnetic cassettes, flash memory cards, digital video disks, Bernoulli cartridges, and the like, may also be used in the exemplary operating environment, and further that any such media may contain computer-executable instructions for performing the methods of the embodiments described herein.

A number of program modules may be stored in the drives and RAM 825, including an operating system 835, one or more application programs 836, other program modules 837, and program data 838. It is noted that the operating system 835 in the illustrated computer may be substantially any suitable operating system.

A user may enter commands and information into the computer 820 through a keyboard 840 and a pointing device, such as a mouse 842. Other input devices (not shown) may include a microphone, a joystick, a game pad, a satellite dish, a scanner, or the like. These and other input devices are often connected to the processing unit 821 through a second interface 846 that is coupled to the system bus, but may be connected by other interfaces, such as a parallel port, a game port, a wireless port, or a universal serial bus (USB). A monitor 847 or other type of display device is also connected to the system bus 823 via an interface, such as a video adapter 848. In addition to the monitor, computers may also include other peripheral output devices (not shown), such as speakers and printers.

The computer 820 may operate in a networked environment using logical connections to one or more remote computers, such as a remote computer 849. The remote computer 849 may be a workstation, a server computer, a router, a peer device or other common network node, and typically includes many or all of the elements described relative to the computer 820, although only a memory storage device 850 is illustrated in FIG. 8. The logical connections depicted in FIG. 8 may include a local area network (LAN) 851 and a wide area network (WAN) 852. Such networking environments are commonplace in offices, enterprise-wide computer networks, Intranets and the Internet.

When employed in a LAN networking environment, the computer 820 may be connected to the LAN 851 through a network interface or adapter 853. When utilized in a WAN networking environment, the computer 820 may include a modem 854, and/or is connected to a communications server on the LAN, and/or has other means for establishing communications over the wide area network 852, such as the Internet. The modem 854, which may be internal or external, may be connected to the system bus 823 via the second interface 846. In a networked environment, program modules depicted relative to the computer 820, or portions thereof, may be stored in the remote memory storage device. It will be appreciated that the network connections shown are exemplary and other means of establishing a communications link between the computers may be employed.

The foregoing description of the exemplary embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A method for deploying environments for testing, comprising:
   providing a library of different topology groupings;
   presenting an interface to a user for receiving environment definitions;
   automatically providing to the user elements from the library of different topology groupings for creating a test environment according to the received environment definitions; and
   performing an update to the library of different topology groupings, the update comprising:
   identifying an environment missing from the library of different topology groupings;
   accessing a template compiler to obtain a template for building a new environment corresponding to the identified environment missing from the library of different topology groupings; and
   building the new environment using instructions provided by the template obtained from the template compiler.

2. The method of claim 1, wherein the providing the library of different topology groupings comprises providing instantaneous availability of a predetermined stock of topology building blocks available for creating topologies, a predetermined stock of prebuilt topology environments and a suite of services for pre-building resources using the predetermined stock of topology building blocks.

3. The method of claim 1, wherein the automatically providing to the user elements from the library of different topology groupings further comprises providing virtual machines, physical machines and IP addresses for creating a topology according to the environment definitions provided by the user.

4. The method of claim 1, wherein the providing the library of different topology groupings further comprises automatically building, checking and monitoring the different topology.

5. The method of claim 1 further comprising verifying that a needed number of topologies are available again when the building the new environment succeeds and initiating tools for repairing the new environment being built when the process fails.

6. The method of claim 5, wherein the initiating tools for repairing the new environment being built when the process fails comprises identifying lost or orphaned resources, and handing the identified lost or orphaned resources to a predetermined recovery subsystem for automatic recovery of the identified lost or orphaned resources.

7. The method of claim 1 further comprising managing the checking in and checking out of virtual machines, capturing a snapshot of a configuration for virtual machines checked out and reverting failed virtual machines using the captured snapshot.

8. The method of claim 1, wherein the providing a library of different topology groupings further comprises providing a common language and development mechanism for representing the different topology groupings in the library.

9. The method of claim 1, wherein the presenting an interface to a user further comprises providing a client webpage front end for providing a management user interface for users to check-out and check-in topologies from the library of different topology groupings.

10. A system having a processor for deploying environments for testing, comprising:
- a resource picker for providing a library of different topology groupings and configured to manage resources and to implement check-in and check-out of the resources;
- a primer for providing a suite of services for using resources to create topology building blocks for the library of different topology groupings; and
- a client webpage interface for enabling users to provide environment definitions for creating a desired topology from the library of different topology groupings;
- wherein, upon receiving the environment definitions through the client webpage interface, the primer automatically providing to the user elements from the library of different topology groupings for creating a test environment according to the received environment definitions, wherein the primer automatically builds, checks and monitors the different topology groupings in the library and performs an update to the library of different topology groupings after automatically providing to the user elements from the library of different topology groupings and wherein the primer performs the update to the library of different topology groupings by comparing pool configurations of an environment that is needed and an environment the resource picker indicates as being currently available, accessing a template compiler to obtain a template for building a new environment based on the comparison, and building the new environment using instructions provided by the template obtained from the template compiler.

11. The system of claim 10, wherein the primer verifies that a needed number of topologies are available again when the building the new environment succeeds and initiates tools for repairing the new environment being built when the process fails.

12. The system of claim 11, wherein the tools initiated by the primer comprise:
- an OML (Orphaned Machine Locator) tool for identifying a lost or orphaned deployment resource, and for handing a lost or orphaned deployment resource off to an appropriate subsystem for automatic recovery;
- an OCR (Orphaned Client Recovery) tool for managing recovery of orphaned physical resources, for re-imaging a physical resource in an unknown or lost state, for re-adding the physical resource to the library, and for sending a SOAP request to a registered web service that hard power cycles the physical machine remotely; and
- an ALIS (All Labs Integration Services) system capturing a snapshot of a configuration of a virtual machine and reverting the virtual machine to the captured snapshot.

13. The system of claim 10 further comprising a template authority device for providing a common language and development platform representing configurations as re-usable building blocks.

14. The system of claim 13, wherein the template authority device further comprises a template compiler, dictionaries/intention files, task chains and a topology cop, wherein the task chains comprise logical groups of tasks tied together in a topology fragment, the intention files define a topology with references to the task chains and other variables, the template compiler and topology cop provide checks to ensure accuracy of the resultant topology by validating compiled topology environments.

15. The system of claim 10 further comprising a topology builder configured for building topologies, wherein the primer queries the resource picker for a machine to transform and creates a work order for the topology builder instructing the topology builder to transform a resource into a desired state, wherein the topology builder transforms the machine according to the steps in the work order.

16. The system of claim 15, wherein the primer monitors the resource picker and the topology builder for predetermined symptoms and initiates the OML tool and the OCR tool, wherein the OML tool detects the symptom and takes the machine back for re-provisioning and the OCR tool cleans the machine's records using resource picker and topology builder.

17. A computer readable storage device having stored therein data representing instructions executable by a computer to implement a method for deploying environments for testing, comprising:
- providing a library of different topology groupings;
- presenting an interface to a user for receiving environment definitions;
- automatically providing to the user elements from the library of different topology groupings for creating a test environment according to the received environment definitions; and
- performing an update to the library of different topology groupings, the update comprising:
  - identifying an environment missing from the library of different topology groupings;
  - accessing a template compiler to obtain a template for building a new environment corresponding to the identified environment missing from the library of different topology groupings; and
  - building the new environment using instructions provided by the template obtained from the template compiler.

* * * * *